(12) United States Patent
Gochi Garcia et al.

(10) Patent No.: US 11,943,147 B2
(45) Date of Patent: *Mar. 26, 2024

(54) METHOD OF DETERMINING PASSIVE ROUND TRIP TIME, RTT, DELAY IN A TELECOMMUNICATIONS SYSTEM

(71) Applicant: Telefonaktiebolaget LM Ericsson (publ), Stockholm (SE)

(72) Inventors: Ibon Gochi Garcia, Madrid (ES); Javier Muñoz Kirschberg, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,954

(22) Filed: Mar. 22, 2021

(65) Prior Publication Data

US 2021/0211385 A1    Jul. 8, 2021

Related U.S. Application Data

(63) Continuation of application No. 16/090,762, filed as application No. PCT/EP2018/057884 on Mar. 28, 2018, now Pat. No. 10,972,399.

(30) Foreign Application Priority Data

Feb. 28, 2018  (EP) ..................................... 18382122

(51) Int. Cl.
*H04L 12/841*    (2013.01)
*H04L 47/193*    (2022.01)
(Continued)

(52) U.S. Cl.
CPC .......... *H04L 47/283* (2013.01); *H04L 47/193* (2013.01); *H04L 61/00* (2013.01);
(Continued)

(58) Field of Classification Search
CPC ............. H04L 47/283; H04L 29/12009; H04L 47/193; H04L 61/2514; H04L 69/163; H04L 43/10; H04L 69/16
See application file for complete search history.

(56) References Cited

U.S. PATENT DOCUMENTS 7,633,943 B2    12/2009  MeLampy et al.
7,636,321 B1    12/2009  Jannaccone et al.
(Continued)

FOREIGN PATENT DOCUMENTS

JP    2003163685 A    6/2003
JP    2005117587 A    4/2005
(Continued)

*Primary Examiner* — Vinncelas Louis
(74) *Attorney, Agent, or Firm* — COATS & BENNETT, PLLC (57) ABSTRACT

A method of determining a passive Round Trip Time, RTT, delay in a telecommunications system for exchanging data packets in accordance with a data transmission protocol between a first device and a second device. The first and second devices are identified by first and second device identifications, respectively. The data packets include an address part including a source address and a destination address. The method is performed in a node by modifying the address part of a received data packet from the first device, and creating a first timestamp before transmitting the modified data packet to the second device. Upon receiving, at the node, from the second device in response to the modified data packet, a data packet having the modified address part of the modified data packet, the node creates a second timestamp that provides for passively measuring the RTT delay.

25 Claims, 6 Drawing Sheets

(51) Int. Cl.
  *H04L 47/283* (2022.01)
  *H04L 61/00* (2022.01)
  *H04L 61/2514* (2022.01)
  *H04L 69/163* (2022.01)
  *H04W 80/04* (2009.01)

(52) U.S. Cl.
  CPC ........ *H04L 61/2514* (2013.01); *H04L 69/163* (2013.01); *H04W 80/04* (2013.01)

(56) References Cited

U.S. PATENT DOCUMENTS

| | | | |
|---|---|---|---|
| 7,953,022 B2 * | 5/2011 | Chun | H04L 1/1825 370/231 |
| 9,825,855 B2 | 11/2017 | Sugiyama et al. | |
| 2003/0106067 A1 | 6/2003 | Hoskins et al. | |
| 2017/0346709 A1 * | 11/2017 | Menon | H04L 43/10 |
| 2017/0346749 A1 * | 11/2017 | Weiser | H04L 47/27 |

FOREIGN PATENT DOCUMENTS

| | | |
|---|---|---|
| JP | 2009290524 A | 12/2009 |
| JP | 2017017587 A | 1/2017 |
| WO | 2013057773 A1 | 4/2013 |
| WO | 2017131565 A1 | 8/2017 |

* cited by examiner

METHOD OF DETERMINING PASSIVE ROUND TRIP TIME, RTT, DELAY IN A TELECOMMUNICATIONS SYSTEM

RELATED APPLICATIONS

The present application is a continuation of U.S. patent application Ser. No. 16/090,762, which was filed on Oct. 2, 2018, which is a national stage application of PCT/EP2018/057884, which was filed Mar. 28, 2018, and claims benefit of EP Application No. 18382122.2, which was filed Feb. 28, 2018, the disclosures of each of which are incorporated herein by reference in their entirety.

FIELD OF THE INVENTION

The present disclosure generally relates to telecommunications and, in particular, to a telecommunications system for exchanging data packets in accordance with a data transmission protocol between devices operatively connected to the telecommunications system. The present disclosure further relates to a computer readable storage medium comprising computer program code instructions for configuring one or a plurality of servers for providing gateway functionality for operating the method.

BACKGROUND

Round-Trip-Time, RTT, is the duration, generally measured in milliseconds, from when a first or client device, such as a server or node in a telecommunications system, sends a request to a second device, such as another server or another node in the telecommunications system, and when the first device receives a response from the second device. RTT is a key performance metric in telecommunications systems for network load and network latency, for example. RTT is generally measured per flow or 5-tuple, with higher order aggregations being possible, RTT between the User Equipment, UE, and a network node etc.

For the purposes and applications of telecommunications systems and in bi-directional communications between a client and a server, the RTT is generally calculated directionally, that is from the telecommunications system towards the client, called RTTc, and from the telecommunications system towards the server, called RTTs, and per flow or 5-tuple. The RTT may also be measured between equally capable peers such as between two servers or between two clients.

In the case of a communication between a client and a server in the telecommunications system wherein the client accesses the telecommunications system through an access network, such as a Radio Access Network, RAN, RTTc can be calculated as the time between a segment or data packet transmitted by the server towards the client in the downlink, crosses a monitoring point, such as a node, in the access network and the time the acknowledgment towards the server crosses the same monitoring point in the uplink.

In such communication, RTTs can be calculated as the time between a segment or data packet node towards the server in the uplink crosses the monitoring point in the access network and the time the acknowledgment towards the client crosses the same monitoring point in the downlink.

Applications and use cases using RTT measurements may include:

a. Quality of Experience measurements and Analytics: for instance, in a telecommunications system like a mobile telecommunications system, the RTTc represents the distance to the client including the access network, such as a RAN. High RTTc values may indicate a problem in the transmission of information to the client, such as excessive buffering of data packets, too many transmission hops as a result of incorrect routing, low data rate transmission lines, etc. Similarly, high RTTs values may also point to excessive buffering and slow transmission lines, but may also indicate that clients are accessing servers that are either remote or highly loaded (there is a delay in the responses) which can indicate a problem supplying the content.

b. Traffic Optimizations: implementation of several Active Queue Management, AQM, techniques such as the CoDel algorithm—based on a controlled delay approach relay—per 5-tuple or flow RTT measurements both towards the client and the server require RTT knowledge.

There are several other applications and use cases in telecommunications system that use per flow or 5-tuple RTT measurements.

RTT calculations from the telecommunications system can be done actively, wherein the telecommunications system sends a data packet or message to a node, waits for the response and measures the time elapsed, or passively, using subscriber traffic that is already being carried by the telecommunications system.

Active RTT measurements include Internet Control Message Protocol, ICMP, messages (typically called sending a "ping"). Passive RTT measurements are available on certain transport protocols like the Transport Control Protocol, TCP, by measuring the time it takes the receiver of a data packet to confirm its reception. Such techniques are covered in the prior art.

Active RTT measurements require the telecommunications system to send additional traffic and requires the receiver of the packet or message to support its processing and to answer to it. It is therefore a coordinated procedure not supported by all network elements. Also, it is an obvious procedure—when implemented it is clear that the telecommunications system is performing a measurement—which can lead to information leakage and can be vulnerable to tampering.

Passive RTT measurements do not require support from the endpoints, since the telecommunications system re-uses existing traffic to calculate the RTT wherein all endpoints support passive RTT measurements. Passive RTT measurements are also 'silent'—it is impossible to tell if a telecommunications system is performing an RTT measurement on a certain flow. Passive RTT measurements also do not generate additional traffic and do not rely on intermediary elements to forward the required messages.

Passive prior art RTT measurements may only work on certain protocols. The telecommunications system requires the protocols carrying the underlying traffic to allow for the measurement of RTT in order to be able to implement the measurements transparently.

TCP is one of such protocols allowing passive prior art RTT measurements. Passive RTT measurements are possible in telecommunications systems with subscriber TCP traffic because the telecommunications system can inspect—using for instance Deep Packet Inspection, DPI, techniques—sequence numbers of certain TCP nodes and later on correlate acknowledgments to those nodes.

Since TCP contains sequence numbers and acknowledgments, it is relatively easy (and well known) to measure RTT as the time it takes a client or a server to acknowledge a certain sequence number. TCP is bidirectional and allows therefore calculation of RTTc and RTTs.

Assuming that the inspected node generates an acknowledgement on the other end and disregarding the time it takes the TCP stack on the other end to produce the acknowledgement, it can be assumed that the difference in time is the RTT on that direction. This is true since transmission times are generally several orders of magnitude bigger than processing times.

Other major Transport level protocols, are the User Datagram Protocol, UDP, and the Quick UDP Internet Connections, QUIC, protocol, for example. QUIC is a "half-transport" protocol that runs on top of User Datagram Protocol, UDP. The addition of UDP and QUIC delivers all the characteristics and functionality of a transport protocol including in order delivery, retransmissions, congestion control and end-to-end encryption.

QUIC is resilient to changes on the Access Network. An internal identifier is defined in QUIC that allows the server to link two 5-tuples UDP flows from different source IP addresses and ports into the same conceptual QUIC (transport level) flow.

The use case for this resilience is to maintain QUIC flows (and statuses) across telecommunications system changes— when a subscriber disconnects from a telecommunications system and re-joins a different telecommunications system the QUIC flow can be recovered, no renegotiation is required, the encryption context is retrieved and reused and application data exchange can continue un-affected.

QUIC can implement this resiliency by linking the two 5-tuple UDP flows (with different source IP addresses and ports) to the same QUIC flow.

UDP and QUIC, for example, are examples of protocols that do not include sequence numbers or acknowledgment numbers, and when included they are encrypted, like in the case of QUIC, which makes prior art passive RTT measurements over UDP or QUIC impossible. This means that some of the use cases listed above, such as Quality of Experience, QoE, measurements or some Traffic Optimizations, using prior art passive RTT measurements, cannot be applied to QUIC traffic.

US2003/106067A1 discloses the integration of gateway services such as Network Address Translation, NAT, firewalls, proxies into RF cable devices such as cable modem and/or set-top boxes.

U.S. Pat. No. 7,636,321 B1 relates to a method and system of computing the RTT of a connection between a sender and a receiver in a communication network using a single measurement point. The method includes timestamping a first packet travelling past the measurement point and timestamping a second packet travelling past said measurement.

SUMMARY

It is an object of embodiments herein to passively measure RTTs experienced by data packets being exchanged between two devices in a telecommunications system.

In a first aspect of the present disclosure, there is presented a method of determining a passive Round Trip Time, RTT, delay in a telecommunications system for exchanging data packets in accordance with a data transmission protocol between a first device and a second device operatively connected to the telecommunications system, the first device identified by a first device identification, and the second device, identified by a second device identification, the data packets comprising an address part including a source address and a destination address.

The method comprises the steps of:
a. receiving, by a node in the telecommunications system, a data packet originating from the first device and directed to the second device, the address part of the data packet comprising the first device identification as source address and the second device identification as destination address;
b. modifying, by the node, the first device identification of the source address of the received data packet;
c. modifying, by the node, the received data packet having an address part comprising the modified first device identification as source address and the second device identification as destination address, providing a modified data packet;
d. linking, by the node, in an address translation table, the address part of the received data packet with the address part of the modified data packet;
e. transmitting, by the node, at a first point in time, the modified data packet to the second device;
f. receiving, by the node, at a second point in time, from the second device, a further data packet, the further data packet having an address part comprising the modified first device identification as destination address and the second device identification as source address;
g. modifying, by the node, the received further data packet having an address part comprising the first device identification as destination address and the second device identification as source address, using the address translation table, providing a modified further data packet;
h. transmitting, by the node, the modified further data packet to the first device; and
i. determining, by the node, the RTT delay from the first and second point in time.

The method according to the present disclosure does not rely on access to sequence numbers or identifiers, acknowledgement numbers or identifiers, in a data packet, which identifiers may be encrypted, for example, other than the address part that is available for delivering the data packet.

Detecting or identifying the modified first device identification in a further data packet allows for RTT calculations according to the present disclosure. Hence, the method according to the present disclosure is generally applicable to a variety of data transport protocols applied in a telecommunications system. By passively measuring the RTT according to the present disclosure, additional signalling in the communication network is effectively avoided.

By modifying, by the node, the received further data packet using the address translation table, and transmitting the modified further data packet to the first device, the first device will not notice any modifications made to a data packet for the purpose of RTT calculations or measurements according to the present disclosure.

The term address part used in the present disclosure and claims is to be construed as referring to any part of a data packet on any level of a respective network or data transport protocol level relating to origin or source or destination of the data packet. As explained above, RTT is often measured directionally, i.e. RTTc and RTTs. According to an embodiment, the first device is a User Equipment, UE, connecting to an access network of the telecommunications system, and the second device is a server of the telecommunications system, wherein the RTT is measured for Round Trip Time client, RTTc, delay in uplink communication direction.

According to another embodiment, the first device is a server of the telecommunications system and the second device is a User Equipment, UE, connecting to an access network of the telecommunications system, wherein the RTT is measured for Round Trip Time server, RTTs, delay in downlink communication direction.

In a further embodiment, the data transmission protocol is an Internet Protocol, IP, type data transmission protocol, and the address part of a data packet comprises 5-tuple information including IP address and port number of the first device, IP address and port number of the second device, and a protocol identification identifying the data transmission protocol, wherein the node prior to modifying the address part of the received data packet checks the protocol identification included in the address part, and wherein steps b-i are executed dependent on the protocol identification. That is, a modification applied may depend on a particular identified protocol.

The RTT may be measured per flow or per 5-tuple. A 5-tuple refers to a set of five different values that comprise a Transmission Control Protocol/Internet Protocol (TCP/IP) connection. It includes a source IP address/port number, destination IP address/port number and the protocol in use. Alternatively the QUIC protocol may also be employed.

In an embodiment of the present disclosure, steps b-i may be executed when the protocol identification refers to a Quick UDP Internet Connections, QUIC, protocol.

In an embodiment of the method according to the present disclosure, modifying the first device identification comprises modifying one or both of the source IP address and port number. The source IP address may be modified by selecting an IP address from a range that is not used or not used in communications by the respective node of the telecommunications system. However, the IP address may also be selected from a reserved range or otherwise being uniquely.

According to an embodiment of the present disclosure, modifying the source port number comprises one of:
  incrementing the source port number by 1;
  decrementing the source port number by 1;
  incrementing the source port number by an arbitrary integer value;
  decrementing the source port number by an arbitrary integer value.

According to another embodiment of the present method, the source IP address comprises a host part and a network part, wherein modifying the source IP address comprises modifying the host part by one of:
  incrementing the source IP address by 1;
  decrementing the source IP address by 1;
  incrementing the source IP address by an arbitrary integer value;
  decrementing the source IP address by an arbitrary integer value.

When modifying the IP address, it can be checked whether the modified IP address is unique, that is not being in use in communications of the node, either temporarily or permanently, for example.

In accordance with an embodiment of the present disclosure, receiving the further data packet comprises inspecting, by the node, the address part of data packets received from the second device until receiving a first further data packet having an address part comprising the modified first device identification as destination address and the second device identification as source address.

Instead of operating on a single data packet, in an embodiment of the present disclosure, modifying the data packet received from the first device is applied, by the node, to all subsequent data packets for a same data stream received from the first device and/or from the second device.

The first point in time and the second point in time are stored, in an embodiment of the method according to the present disclosure, as a first time stamp and a second time stamp in the address translation table stored in the node.

The node may be one of a Packet Data Network, PDN, Gateway, P-GW, and a Policy Control and Enforcement Point, PCEP, arranged in an access network of the telecommunications system.

In a second aspect of the present disclosure, there is presented a node, arranged for operating in a telecommunications system, for determining a passive Round Trip Time, RTT, delay for exchanging data packets in accordance with a data transmission protocol between a first device and a second device operatively connected to the telecommunications system, the node comprising a transceiver device for exchanging the data packets, a storage device for storing an address translation table, and a computer controlled RTT measuring device, wherein the RTT measuring device is arranged for controlling the transceiver device and the storage device for performing the method according to any of the previous claims.

In a third aspect of the present disclosure, there is presented a computer program product, comprising program code stored on a computer readable medium, the program code comprising computer instructions for performing the method according to any of the embodiments presented in the first aspect of the present disclosure, when the program code is executed by a computer of a node arranged in a telecommunications system for exchanging data packets in accordance with a data transmission protocol between a first device a second device operatively connected to the telecommunications system.

The above-mentioned and other aspects of the disclosure will be apparent from and elucidated with reference to the examples described hereinafter, assuming the Quick User Datagram Protocol, UDP, Internet Connections, QUIC, protocol as the packet data transport or data traffic protocol in use. It is. however, expressly noted that the present disclosure is not to be construed as being limited to the QUIC protocol.

DETAILED DESCRIPTION

Figure 1:
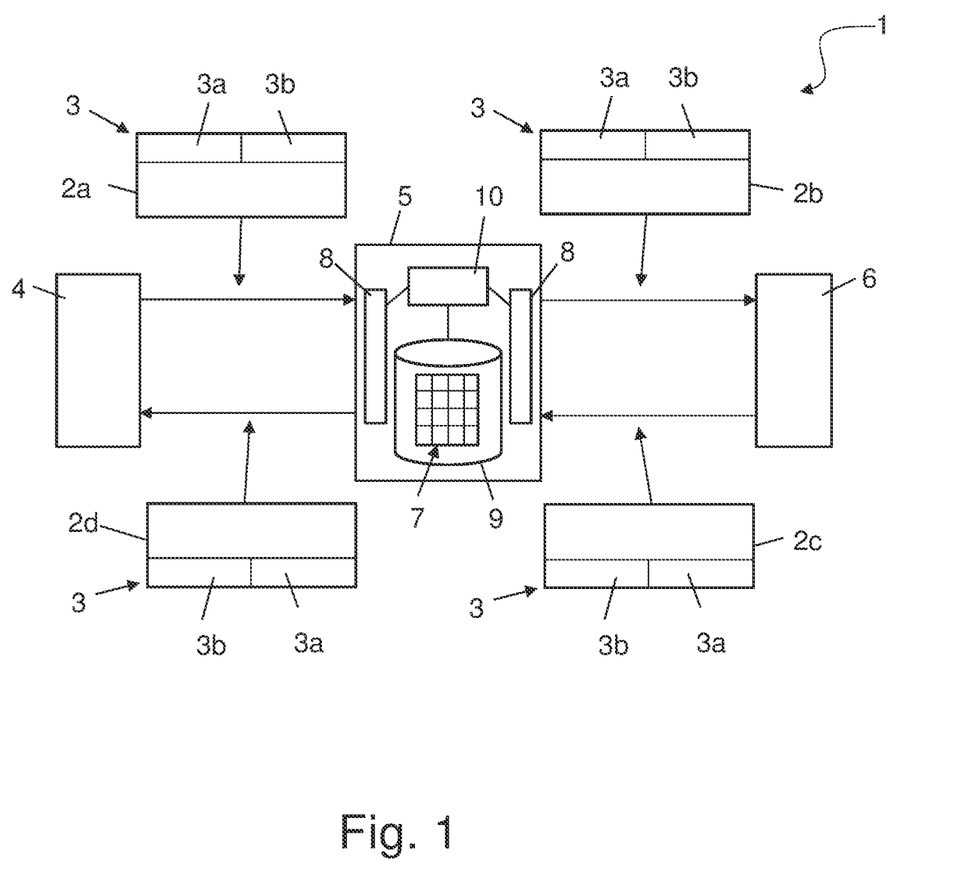
FIG. 1 illustrates, schematically, a telecommunications system for exchanging data packets for passive RTT measurement.

In FIG. 1, reference numeral 1 refers to a telecommunications system 1 for exchanging data packets 2a-2d in accordance with a data transmission protocol between a first device 4 and a second device 6 operatively connected to the telecommunications system 1, by an intermediate node 5 of an access network, such as a Radio Access Network, RAN, for example. The first device 4 is identified by a first device identification, and the second device 6 is identified by a second device 6 identification. The data packets 2a-2d, among a content part, preamble and/or other parts for transmission purposes, for example, each comprise an address part 3 including a destination address 3a and a source address 3b. The term address part used in the present disclosure and claims is to be construed as referring to any part of a data packet on any level of a respective network or data transport protocol level relating to an origin or source or a destination of the data packet.

In the event of data packet transmitted from the first device 4 to the second device 6, the source address 3b of this data packet refers to the first device identification and the destination address 3a refers to the second device identification. In case of a data packet transmitted from the second device 6 to the second first device 4, the source address 3b of this data packet refers to the second device identification and the destination address 3a refers to the first device identification.

The node 5 comprises transceiver equipment 8 arranged for exchanging the data packets 2a-2d in the telecommunications system 1 between the first device 4 and the second device 6. When a data packet 2a, transmitted from the first device 4 to the second device 6, is received by the node 5, the node 5 modifies the source address part 3b of the data packet 2a before transmitting the data packet to the second device 6. The modified data packet 2b, having a modified source address part 3b, is then transmitted by the node 5 to the second device 6. In the node 5, an address translation table 7 is maintained which links at least the source address part 3b of data packet 2a to the modified address part 3 of the data packet 2b. Before transmitting data packet 2b to the second device 6, a first point in time, the node maintains a first timestamp in order to identify the first point in time at which the data packet 2b was transmitted by the node 5.

At a second point in time, after the first point in time, the second device 6 transmits, in response to the received data packet 2b, a further data packet 2c. The destination address part 3a of this further data packet 2c comprises the modified source address part 3b of the data packet 2b and the source address part 3b of this further data packet 2c refers to the second device identification. At receipt of this further data packet 2c with the node 5, the node 5, prior to transmitting the further data packet 2c to the first device 4, inspects the address part 3 of the further data packet 2c for correspondence with address parts 3 stored in the address translation table 7. As the address part 3 of the further data packet 2c contains the content of the address part 3 of data packet 2b, which content is stored in the address translation table 7, based on the entry of the address part 3 of data packet 2b, the node 5 modifies the address part 3 of the further data packet 2c by replacing the destination address part 3a of this further data packet 2c by the source address part of data packet 2a maintained in the address translation table 7. This results in the data packet 2d to be transmitted by the node 5 to the first device 4. The second point in time of receiving the further data packet 2c at the node 5, the node 5 maintains a second timestamp in order to identify the time at which the data packet 2c was received by the node 5.

From the difference between the two time stamps, or otherwise taking into account processing times at the node 5, for example, the node 5 then determines the respective RTT relating to the transmission of the data packets 2b and 2c in the part of the telecommunications system 1 connecting the node 5 and the second device 6.

It will be appreciated that the above disclosed method may be applied, in a similar manner, for data packet exchange between the node 5 and the first device 4, to measure the RTT at the part of the telecommunication system 1, between the first device 4 and the node 5.

Figure 2:
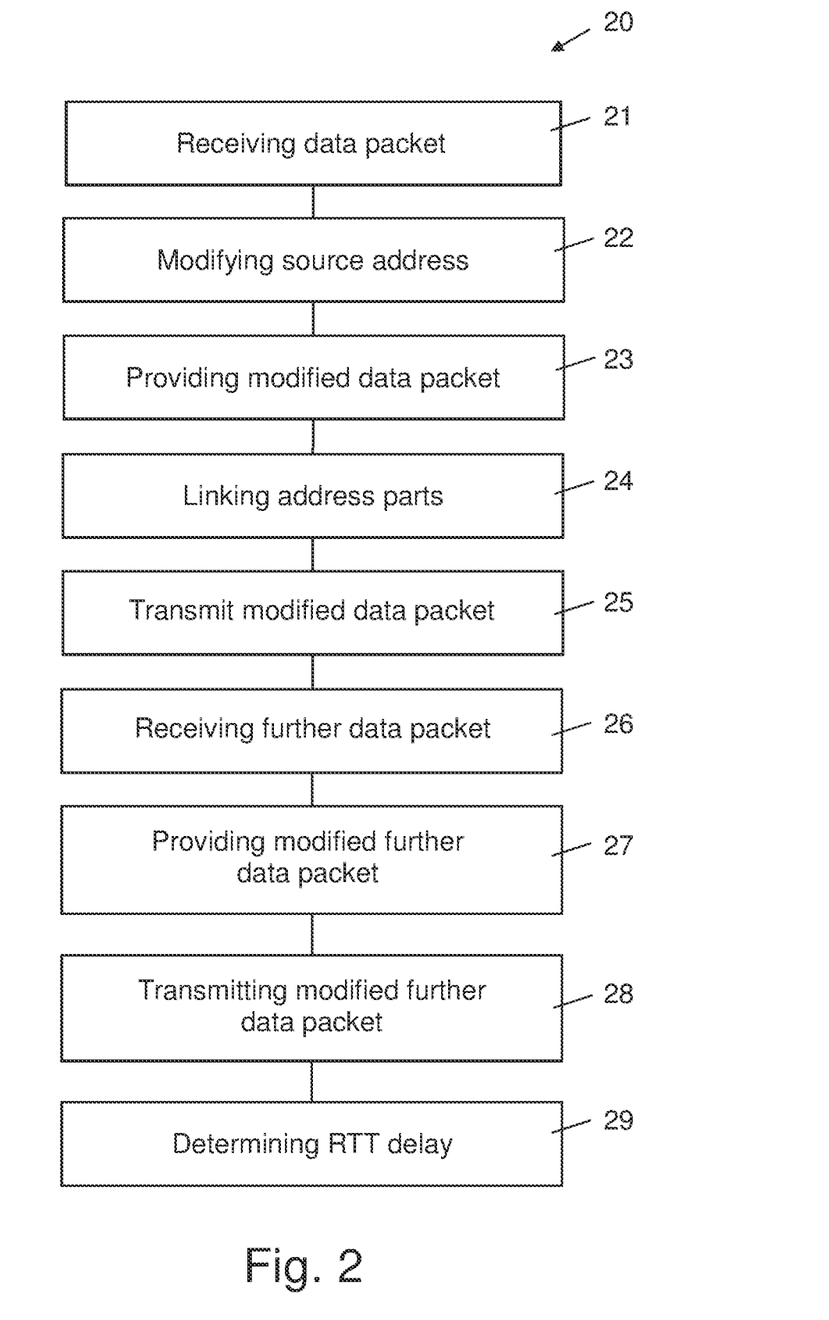
FIG. 2 illustrates, in a flowchart type diagram, general steps of the method according to the present disclosure.

FIG. 2 shows the above disclosed steps in flowchart type diagram 20, wherein time is assumed running from top to bottom of the figure.

Block 21, "Receiving data packet", refers to receiving of a data packet 2a at the node 5. Block 22, "Modifying source address", refers to the modification, by the node 5, of the source address 3a of the received data packet 2a, of the first device identification. Block 23, "Providing modified data packet", illustrates modification, by the node 5, of the received data packet 2a, providing a modified data packet 2b having an address part comprising the modified first device identification as source address 3b and the second device identification as a destination address 3a. Block 24, "Linking address parts", refers to the linking, by the node 5, in the address translation table 7, of the address part 3 of the received data packet 2a with the address part 3 of the modified data packet 2b.

Block 25, "Transmit modified data packet", refers to the transmitting, by the node 5, to the second device 6, at a first point in time, the modified data packet 2b. Block 26, "Receiving further data packet", shows receipt, at a second point in time later than the first point in time, at the node 5, of a further data packet 2c having an address part 3 comprising the modified first device identification as destination address 3a and the second device identification as source address 3b. Block 27, "Providing modified further data packet", refers to the modification, by the node 5, of the received further data packet 2c using the address translation table 7, providing a modified further data packet 2d, having an address part 3 comprising the first device identification as destination address 3a and the second device identification as source address 3b.

Block 28, "Transmitting modified further data packet", illustrates the transmission, by the node 5, of the modified further data packet 2d to the first device 4. Block 29, "Determining RTT delay" refers to the calculation, by the node 5, of the RTT delay from the first and second point in time.

The skilled person will appreciate that the method may be used to determine the RTT between any two peers or between two devices situated on different hierarchical levels—for example a UE and a server. For the uplink direction, the first device 4 or client may be a User Equipment, UE, connecting to an access network of the telecommunications system 1, such as a mobile UE connecting to a RAN. For Round Trip Time client, RTTc, delay in uplink communication direction the second device 6 may be a server of the telecommunications system 1. For measuring Round Trip Time server, RTTs, delay in downlink communication direction, the first device 4 is the server of telecommunications system 1 and the second device 6 is the User Equipment, UE.

Once a modified data packet 2b is transmitted by the node 5, receiving a further data packet 2c at the node 5 includes inspecting, by the node 5, the address part 3 of each data packet received from the second device 6, until receiving a first further data packet 2c having an address part 3 comprising the modified source address of the first device 4 as destination address and a source address referring to the second device 6.

Modification of the address part 3 of a data packet may comprise modification of a respective device identification to which the address part refers.

In an Internet Protocol, IP, type data transmission protocol, the address part 3 of a data packet comprises 5-tuple information including the IP address and port number of the first device 4 as the first device identification, and the IP address and port number of the second device 6 as the second device identification, and a protocol identification identifying the data transmission protocol. The node 5, prior to modifying the address part 3 of received data packet 2b may check the protocol identification included in the address part 3. For completeness sake it is noted that port number refers to Transport level, i.e. level four, and IP addresses refer to Network level, i.e. level three, of the conceptual seven-layer Open Systems Interconnection, OSI, communications model.

Hence, in an IP data type transmission protocol, it is possible to modify the device identification by modifying one or both of source IP address and port number. Modifying the source port number may comprise one of:
  incrementing the source port number by 1;
  decrementing the source port number by 1;
  incrementing the source port number by an arbitrary integer value;
  decrementing the source port number by an arbitrary integer value.

The source IP address comprises a host part and a network part, wherein modifying the source IP address comprises modifying the host part by one of:
  incrementing the source IP address by 1;
  decrementing the source IP address by 1;
  incrementing the source IP address by an arbitrary integer value;
  decrementing the source IP address by an arbitrary integer value.

When modifying the IP address, it can be checked whether the modified IP address is unique, that is not being in use in communications of the node, either temporarily or permanently, for example, or whether the modified IP address is part of a reserved range or otherwise uniquely. Modifying the address part of data packet 2a received from the first device 4 may be applied, by node 5, to all subsequent data packets 2a for a same data stream received from the first device 4, such that modifying the address part of the further data packets 2c received from the second device 6, by node 5, applies to all subsequent further data packets 2c for a same data stream received from the second device 6.

The first point in time and second point in time may be stored as a first time stamp and a second time stamp in the address translation table 7, stored in the node 5. The node 5 may be a Packet Data Network, PDN, Gateway, P-GW, or a Policy Control and Enforcement Point, PCEP, arranged in an access network of the telecommunications system 1, for example.

A node 5 for operating in a telecommunications system 1, for determining the passive Round Trip Time, RTT, delay in accordance with the present disclosure, is to be arranged with a storage device 9 for storing the address translation table 7, and a computer controlled RTT measuring device, schematically indicated by reference numeral 10 in FIG. 1, wherein the RTT measuring device 10 is arranged for controlling transceiver equipment 8 and storage device 9 for performing the passive Round Trip Time calculation.

The techniques and mechanisms described in this invention are applicable to any cloud implementation.

This technique provides a transparent marking mechanism for the passive calculation of RTT towards the client and towards the server.

The technique is in all scenarios completely transparent towards one of the two endpoints. Towards the other endpoint the passive monitoring may result in an effect similar to a change of the access network (changed in assigned IP address or port). The solution allows for multiple RTT measurements per flow. The solution works for Quick UDP Internet Connections, QUIC, protocol data traffic and other half-transport protocols over UDP that allow for resiliency against access network changes. Passive calculation of RTT allows for the implementation of QoE measurements, analytics use cases and optimization of traffic.

Figure 3:
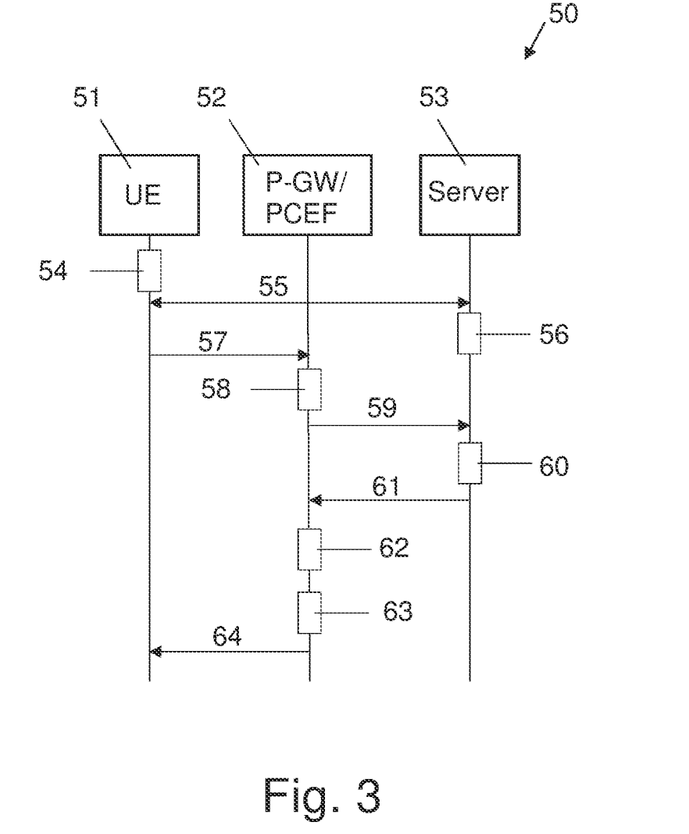
FIG. 3 represents graphically RTTs calculation for QUIC traffic via UDP level marking (UDP port).

The following example will describe, with reference to FIG. 3, the calculation of RTTs in the case of QUIC protocol.

This example assumes an implementation on the functionality required in a Packet Gateway, P-GW, 52 or a Policy Control and Enforcement Point Function, PCEF, 52 this being the node 5 of a Mobile Access Network as in a telecommunications system 1, according to FIG. 1.

In this example the following steps should be followed for the calculation of RTTs using address part 3 of a data packet 2 in particular in this example port value is address part 3, first device 4 is a source, second device 6 is a server. In the particular example referring to FIGS. 3-6, The device 51 is a UE or a QUIC client and the device 53 is a QUIC server with which the UE 51 communicates.

The implementation on the P-GW 52 identifies 55 a QUIC flow with the following 5-tuple information 2a. When a new passive RTTs measurement is required, the P-GW 52 will wait for a new data packet 2a on the uplink for the chosen QUIC flow. When a data packet is received 57 at the P-GW 52, the source port 3 is incremented 58 by one. Alternatively, the source port 3 may be incremented or decremented by any other value.

The P-GW 52 will store this modification 58 in a table by storing the "old source port" from the UE 51, the "new source port" and the rest of the values of the UDP 5-tuple. The data packet is then sent 59 to the server 53 with the new source port 3. The P-GW 52 stores a timestamp of this event 59 i.e.—the modification and forwarding of the uplink data packet 2b.

For all subsequent data packets 2b on the uplink for this QUIC flow (UDP 5-tuple) the source port 3 with value "old source port" should be replaced by the "new source port" value. The P-GW 52 inspects downlink traffic 61 that matches the four original parameters of the 5-tuple 3. Specifically: protocol UDP, source IP address srvIP, source port srvPort and destination IP address ueIP IP addresses and ports are mirrored from the uplink.

When a data packet 2c on the downlink matches this filter, check the destination port. If the destination port matches the "old source port" the data packet 2d is forwarded and it is assumed that this data packet 2d is not an acknowledgment for the modified uplink data packet 2c.

For the first data packet 61 that matches the previous filter with the destination port matching the "new source port", a new timestamp is stored in the P-GW 52 signalling the first acknowledgment of the modified uplink data packet 2c. RTTs is calculated 62 as the difference of the two timestamps recorded. Therefore, the RTTs is measured as the time difference between the first timestamp obtained when transmitting 59 the modified data packet and the second timestamp obtained when a first data packet matching the filter is received 61.

From this data packet 2c on—and for all the data packets 2c received on the downlink for this QUIC flow (UDP 5-tuple)—the destination port containing a value "new source port" should be replaced 63 by the original value "old source port". This mechanism introduces, per RTTs measurement, only one port change on the uplink (detected by the server) and no changes on the downlink (no changed changes detectable by the client) as the change is undone on the downlink for all subsequent data packets 2c.

Once an RTTs measurement is completed another one can be performed on the same flow, by introducing additional increments (or decrements) of source ports 3. The source port 3 change introduced simulates an Access Network change of the client/UE 51 or a Carrier Grade Network Address Translation, CGNAT, change affecting the client/UE 51. This is more typical since such changes might only affect client/UE ports and not IP addresses.

Figure 4:
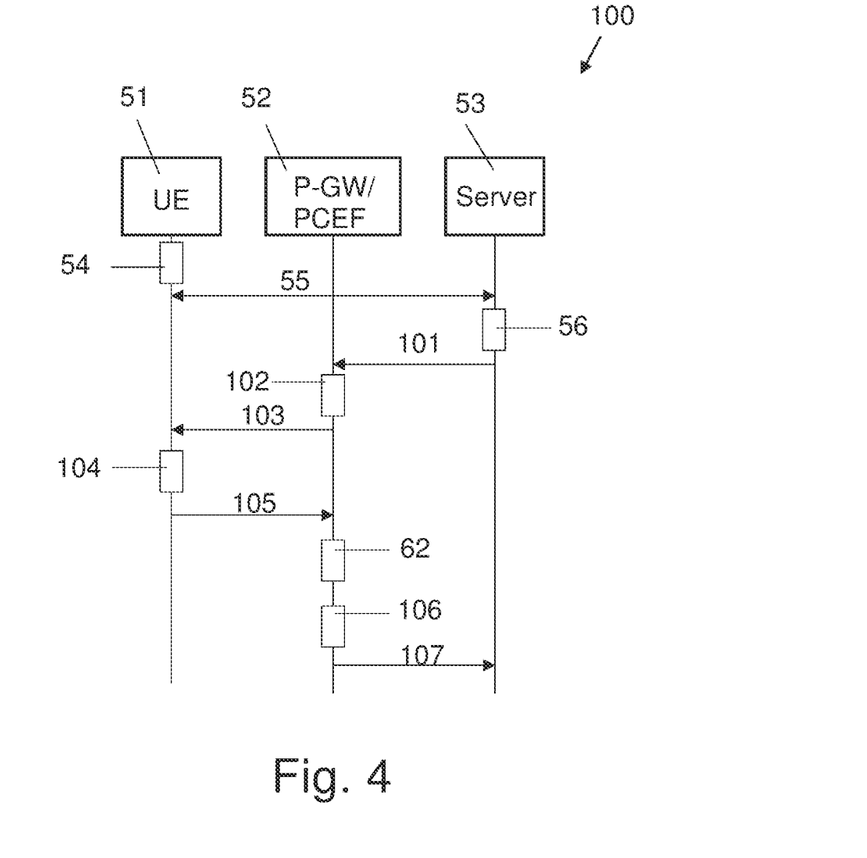
FIG. 4 represents, graphically, RTTc calculation for QUIC traffic via UDP level marking (UDP port).

Similar steps should be followed for the calculation of RTTc using port marking, which is explained in reference to FIG. 4. In this example 100, a P-GW 52 is the Access Network 5, first device 4 is a QUIC server 53 and second device 6 is a client/UE 510, and the modified information of an address data packet 3 is a port value.

The implementation on the P-GW 52 identifies a QUIC flow 55 with the following 5-tuple information: UDP as the transport protocol, client IP address and port being ueIP and uePort and server IP address and port being srvIP and srvPort.

When a new passive RTTc measurement is required the P-GW 52 will wait for a new data packet 101 on the downlink for the chosen QUIC flow 56. When the data packet is received 101, the source port is incremented 102 by one. Alternatively, the source port can be incremented or decremented by any other value. The P-GW 52 will store this modification in a table by storing the "old source port" from the server, the "new source port" and the rest of the values of the UDP 5-tuple.

The data packet 2b is then sent 103 to the UE 51 with the new source port. The P-GW 52 stores a timestamp of this event (the modification and forwarding of the downlink data packet 2b). For all subsequent data packets 2b on the downlink for this QUIC flow (UDP 5-tuple) the source port with value "old source port" should be replaced by the "new source port" value. The P-GW 52 inspects uplink traffic 2c that matches the four original parameters of the 5-tuple. Specifically: protocol UDP, source IP address ueIP, source port uePort and destination IP address srvIP (IP addresses and ports are mirrored from the downlink).

When a data packet 105 on the uplink matches this filter, check the destination port. If the destination port matches the "old source port" the data packet 2d is forwarded and it is assumed that this data packet 2d is not an acknowledgment for the modified downlink data packet 2c. For the first data packet 105 that matches the previous filter with the destination port matching the "new source port", a new timestamp is stored in the P-GW 52 signalling the first acknowledgment of the modified downlink data packet 2c.

RTTs is calculated 62 as the difference of the two timestamps recorded. From this data packet 105 on—and for all the data packets 2c received on the uplink for this QUIC flow (UDP 5-tuple)—the destination port containing a value "new source port" should be replaced by the original value "old source port". This mechanism introduces, per RTTs measurement, only one port change on the downlink (detected by the client) and no changes on the uplink (no changes detectable by the server) as the change is undone on the uplink for all subsequent data packets 2c.

Once an RTTs measurement 62 is completed another one can be performed on the same flow, by introducing additional increments (or decrements) of source ports. The source port change introduced simulates an Access Network 5 change of the server 53 or a CGNAT change affecting the server 53—more typical since such changes might only affect server 53 ports and not IP addresses. In any case these changes are rarer in the case of the server 53 (measuring RTTc) than of the client/UE 51 (measuring RTTs). If the server 53 is sitting in a Mobile Access Network 1 then the client/UE 51 and server 53 roles can be reversed and the calculation of RTTs and RTTc becomes symmetrical.

IP Modification Example

The same techniques can be implemented using marking on the IP addresses and not on the ports. The techniques are further elaborated using FIGS. 5 and 6. This example 150 assumes an implementation on the functionality required in a P-GW 52 or a PCEF function this being the node 5 of a Mobile Access Network as in a telecommunications system 1, according to FIG. 1.

Figure 5:
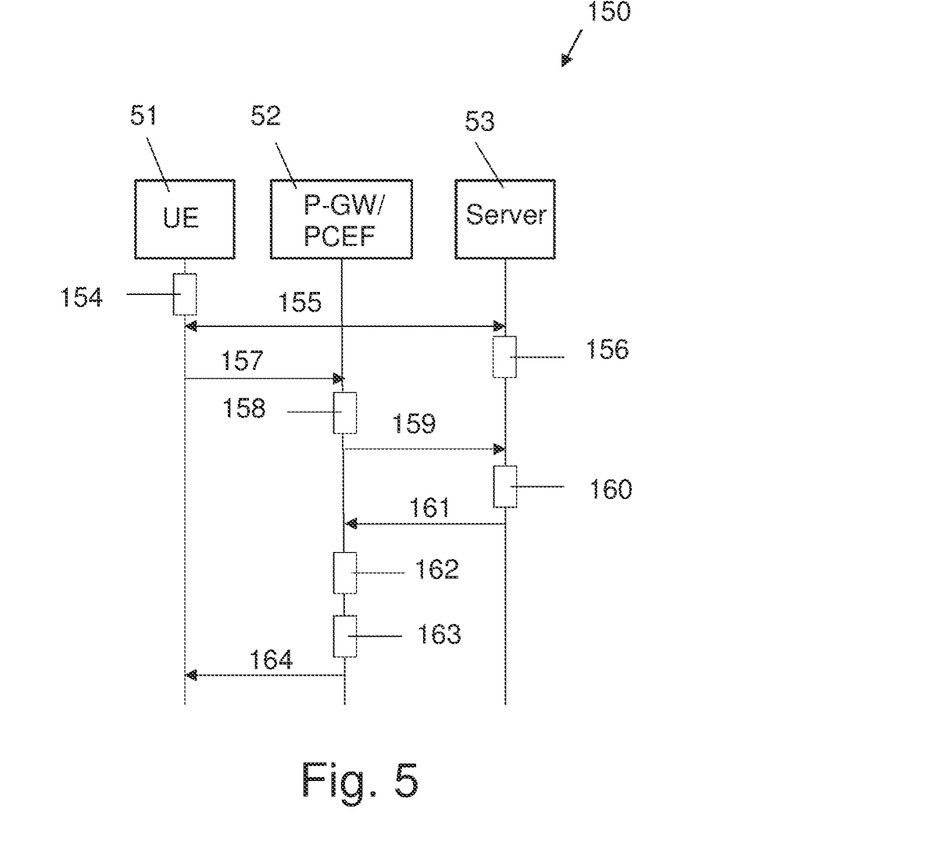
FIG. 5 represents, graphically, RTTs calculation for QUIC traffic via UDP level marking (IP Address).

In this example the following steps should be followed for the calculation of RTTs using address part 3 of a data packet 2 in particular in this example IP value is address part 3, first device 4 is a UE 51, second device 6 is a server 53.

The implementation on the P-GW 52 identifies a QUIC flow 155 with the following 5-tuple information: UDP as the transport protocol, client IP address and port being ueIP and uePort and server IP address and port being srvIP and srvPort. When a new passive RTTs measurement is required the P-GW 52 will wait for a new data packet 2a on the uplink for the chosen QUIC flow. When the packet 2a is received 152, the source IP address is incremented 158 by one. Alternatively, the source IP address can be incremented or decremented by any other value.

The P-GW 52 will store this modification in a table by storing the "old source IP address" from the UE, the "new source IP address" and the rest of the values of the UDP 5-tuple. The data packet 2b is sent 159 to the server 53 with the new source IP address. The P-GW 52 stores a timestamp of this event—the modification and forwarding of the uplink packet.

For all subsequent data packets 2b on the uplink for this QUIC flow (UDP 5-tuple) the source IP address with value "old source IP address" should be replaced by the "new source IP address" value. The P-GW 52 inspects downlink traffic that matches the four original parameters of the 5-tuple. Specifically: protocol UDP, source IP address srvIP, source port srvPort and destination port uePort (IP addresses and ports are mirrored from the uplink).

When a data packet 2c on the downlink matches this filter 161, check the destination IP address. If the destination IP address matches the "old source IP address" the data packet 2d is forwarded and it is assumed that this data packet 2d is not an acknowledgment for the modified uplink data packet 2c. For the first data packet 2c that matches the previous filter 161 with the destination IP address matching the "new source IP address", a new timestamp is stored in the P-GW 52 signalling the first acknowledgment of the modified uplink data packet 2c.

RTTs is calculated 162 as the difference of the two timestamps recorded. From this data packet 2c on—and for all the data packets 2c received on the downlink for this QUIC flow (UDP 5-tuple)—the destination IP address containing a value "new source IP address" should be replaced by the original value "old source IP address". This mechanism introduces, per RTTs measurement, only one IP address change on the uplink (detected by the server) and no changes on the downlink (no changes detectable by the client) as the change is undone on the downlink for all subsequent data packets 2c.

Once an RTTs measurement 162 is completed another one can be performed on the same flow, by introducing additional increments (or decrements) of source IP addresses. The source IP address change introduced simulates an Access Network 5 change of the client/UE 4 or a CGNAT change affecting the client/UE 4.

Figure 6:
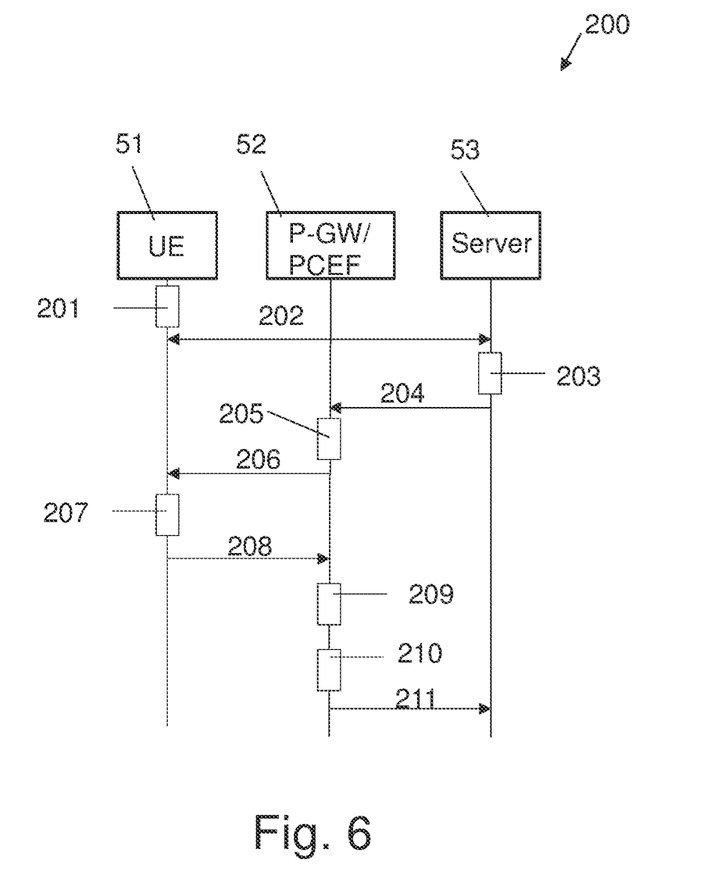
FIG. 6 represents, graphically, RTTc calculation for QUIC traffic via UDP level marking (IP Address).

Similar steps should be followed for the calculation of RTTc using IP marking. This example assumes an implementation on the functionality required in a P-GW 52 or a PCEF this being the node 5 of a Mobile Access Network as a telecommunications system 1.

In this example 200 in FIG. 6, the following steps should be followed for the calculation of RTTs using address part 3 of a data packet 2 in particular in this example IP value is address part 3, first device 6 is a UE 51, second device 4 is a server 53.

The implementation on the P-GW 52 identifies a QUIC flow 202 with the following 5-tuple information: UDP as the transport protocol, client IP address and port being ueIP and uePort, respectively and server IP address and port being srvIP and srvPort respectively.

When a new passive RTTc measurement is required, the P-GW 52 will wait for a new data packet 2a on the downlink for the chosen QUIC flow. When the data packet 2a is received 204, the source IP address is incremented 205 by one. Alternatively, the source IP address can be incremented or decremented by any other value. The P-GW 52 will store this modification in a table by storing the "old source IP address" from the server, the "new source IP address" and the rest of the values of the UDP 5-tuple.

The data packet 2b is sent 206 to the UE 51 with the new source IP address. The P-GW 52 stores a timestamp of this event—the modification and forwarding of the downlink packet. For all subsequent data packets 2b on the downlink for this QUIC flow (UDP 5-tuple) the source IP address with value "old source IP address" should be replaced by the "new source IP address" value.

The P-GW 52 inspects uplink traffic that matches the four original parameters of the 5-tuple. Specifically: protocol UDP, source IP address ueIP, source port uePort and destination IP port srvPort wherein the IP addresses and ports are mirrored from the downlink. When a data packet 2c on the uplink matches this filter, check the destination IP address. If the destination IP address matches the "old source IP address" the data packet 2d is forwarded and it is assumed that this data packet 2d is not an acknowledgment for the modified downlink data packet 2c.

For the first data packet 2c that matches 208 the previous filter with the destination IP address matching the "new source IP address", a new timestamp is stored in the P-GW 52 signalling the first acknowledgment of the modified downlink data packet 2c. RTTs is calculated 209 as the difference of the two timestamps recorded.

From this data packet 2c on—and for all the data packets 2c received on the uplink for this QUIC flow (UDP 5-tuple)—the destination IP address containing a value "new source IP address" should be replaced by the original value "old source IP address". This mechanism introduces, per RTTs measurement, only one IP address change on the downlink (detected by the client) and no changes on the uplink (no changes detectable by the server) as the change is undone on the uplink for all subsequent data packets 2c.

Once an RTTs measurement is completed another one can be performed on the same flow, by introducing additional increments (or decrements) of source IP addresses. The source IP address change introduced simulates an Access Network 5 change of the server server or a CGNAT change affecting the server. In any case these changes are rarer in the case of the server (measuring RTTc) than of the client/UE (measuring RTTs). If the server is sitting in a Mobile Access Network then the client/UE and server roles can be reversed and the calculation of RTTs and RTTc becomes symmetrical.

The example listed above change either the IP addresses or the port. However, additionally other implementations could easily change both the IP address or the port. These scenarios are a natural evolution of the above listed examples and are easily understood by the person skilled in the art. Therefore an explicit description of such scenarios has been avoided.

The use cases listed calculate RTTs and RTTc for QUIC. As it has been shown, no requirement on QUIC exists other than supporting Network Access changes. Any other protocol running on UDP that implements similar techniques for resilience to Access Network changes could also be supported for measurements of RTT—for example like P2P protocols.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only, and not for purposes of limitation.

What is claimed is:

1. A method of determining a passive Round Trip Time (RTT) delay in a telecommunications system for exchanging data packets in accordance with a data transmission protocol between a first device and a second device operatively connected to the telecommunications system, wherein the first device is identified by a first device identification, wherein the second device is identified by a second device identification, wherein the data packets comprise an address part including a source address and a destination address, the method comprising:

receiving, by a node in the telecommunications system, a data packet including an encrypted payload and originating from the first device and directed to the second device, the address part of the data packet comprising the first device identification as source address and the second device identification as destination address;

modifying, by the node, the first device identification of the source address of the received data packet;

modifying, by the node, the received data packet having an address part comprising the modified first device identification as source address and the second device identification as destination address to provide a modified data packet including the encrypted payload;

linking, by the node and in an address translation table, the address part of the received data packet with the address part of the modified data packet;

transmitting, by the node and at a first point in time, the modified data packet to the second device;

receiving, by the node and at a second point in time and from the second device, a response data packet, the response data packet having an address part comprising the modified first device identification as destination address and the second device identification as source address;

modifying, by the node, the received response data packet having an address part comprising the first device identification as destination address and the second device identification as source address, using the address translation table, to provide a modified response data packet;

transmitting, by the node, the modified response data packet to the first device; and determining, by the node, the RTT delay from the first and second points in time.

2. The method of claim 1:
wherein the first device is a User Equipment (UE) connecting to an access network of the telecommunications system;
wherein the second device is a server of the telecommunications system; and
wherein the RTT is measured for Round Trip Time client (RTTc) delay in uplink communication direction.

3. The method of claim 1:
wherein the first device is a server of the telecommunications system;
wherein the second device is a User Equipment (UE) connecting to an access network of the telecommunications system; and
wherein the RTT is measured for Round Trip Time server (RTTs) delay in downlink communication direction.

4. The method of claim 1:
wherein the data transmission protocol is an Internet Protocol (IP) type data transmission protocol;
wherein the address part of a data packet comprises 5-tuple information including IP address and port number of the first device, IP address and port number of the second device, and a protocol identification identifying the data transmission protocol; and
wherein the node, prior to modifying the address part of the received data packet, checks the protocol identification included in the address part.

5. The method of claim 4, wherein the modifying the first device identification comprises modifying one or both of the IP address and port number of the first device.

6. The method of claim 5, wherein the modifying the port number of the first device comprises one of:
incrementing the port number of the first device by 1;
decrementing the port number of the first device by 1;
incrementing the port number of the first device by an arbitrary integer value; and
decrementing the port number of the first device by an arbitrary integer value.

7. The method of claim 4:
wherein the IP address of the first device comprises a host part and a network part;
wherein the modifying the IP address of the first device comprises modifying the host part by one of:
incrementing the IP address of the first device by 1;
decrementing the IP address of the first device by 1;
incrementing the IP address of the first device by an arbitrary integer value; and
decrementing the IP address of the first device by an arbitrary integer value.

8. The method of claim 1, wherein the receiving the response data packet comprises inspecting, by the node, the address part of data packets received from the second device until receiving a first response data packet having an address part comprising the modified first device identification as destination address and the second device identification as source address.

9. The method of claim 1, wherein the modifying the response data packet received from the first device is applied, by the node, to all subsequent data packets for a same data stream received from the first device.

10. The method of claim 1, wherein the modifying the response data packet received from the second device is applied, by the node, to all subsequent response data packets for a same data stream received from the second device.

11. The method of claim 1, wherein the first point in time and the second point in time are stored as a first time stamp and a second time stamp, respectively, in the address translation table stored in the node.

12. The method of claim 1, wherein the node is one of a Packet Data Network (PDN) Gateway (P-GW) and a Policy Control and Enforcement Point (PCEP) in an access network of the telecommunications system.

13. A node, configured to operate in a telecommunications system, for determining a passive Round Trip Time (RTT) delay for exchanging data packets in accordance with a data transmission protocol between a first device and a second device operatively connected to the telecommunications system, wherein the first device is identified by a first device identification, wherein the second device is identified by a second device identification, wherein the data packets comprise an address part including a source address and a destination address, the node comprising:
a transceiver for exchanging the data packets;
a storage device for storing an address translation table; and
a computer controlled RTT measuring device, wherein the RTT measuring device is configured to control the transceiver and the storage device so that the node is operative to:
receive a data packet including an encrypted payload and originating from the first device and directed to the second device, the address part of the data packet comprising the first device identification as source address and the second device identification as destination address;
modify the first device identification of the source address of the received data packet;
modify the received data packet having an address part comprising the modified first device identification as source address and the second device identification as destination address to provide a modified data packet including the encrypted payload;

link, in the address translation table, the address part of the received data packet with the address part of the modified data packet;

transmit, at a first point in time, the modified data packet to the second device;

receive, at a second point in time and from the second device, a response data packet, the response data packet having an address part comprising the modified first device identification as destination address and the second device identification as source address;

modify the received response data packet having an address part comprising the first device identification as destination address and the second device identification as source address, using the address translation table, to provide a modified response data packet;

transmit the modified response data packet to the first device; and determine the RTT delay from the first and second points in time.

14. The node of claim 13:
wherein the first device is a User Equipment (UE) connecting to an access network of the telecommunications system;
wherein the second device is a server of the telecommunications system; and
wherein the RTT is measured for Round Trip Time client (RTTc) delay in uplink communication direction.

15. The node of claim 13:
wherein the first device is a server of the telecommunications system;
wherein the second device is a User Equipment (UE) connecting to an access network of the telecommunications system; and
wherein the RTT is measured for Round Trip Time server (RTTs) delay in downlink communication direction.

16. The node of claim 13:
wherein the data transmission protocol is an Internet Protocol (IP) type data transmission protocol;
wherein the address part of a data packet comprises 5-tuple information including IP address and port number of the first device, IP address and port number of the second device, and a protocol identification identifying the data transmission protocol; and
wherein the node, prior to modifying the address part of the received data packet, checks the protocol identification included in the address part.

17. The node of claim 16, wherein to modify the first device identification, the node is configured to modify one or both of the IP address and port number of the first device.

18. The node of claim 17, wherein to modify the port number of the first device, the node is configured to:
increment the port number of the first device by 1; or
decrement the port number of the first device by 1; or
increment the port number of the first device by an arbitrary integer value; or
decrement the port number of the first device by an arbitrary integer value.

19. The node of claim 16:
wherein the IP address of the first device comprises a host part and a network part; and
wherein to modify the IP address of the first device, the node is configured to:
increment the IP address of the first device by 1; or
decrement the IP address of the first device by 1; or
increment the IP address of the first device by an arbitrary integer value; or
decrement the IP address of the first device by an arbitrary integer value.

20. The node of claim 13, wherein to receive the response data packet, the node is configured to inspect the address part of data packets received from the second device until receiving a first response data packet having an address part comprising the modified first device identification as a destination address and the second device identification as a source address.

21. The node of claim 13, wherein the node is configured to apply the modified response data packet received from the first device to all subsequent data packets for a same data stream received from the first device.

22. The node of claim 13, wherein the node is configured to apply the data packet received from the second device to all subsequent response data packets for a same data stream received from the second device.

23. The node of claim 13, wherein the first point in time and the second point in time are stored as a first time stamp and a second time stamp, respectively, in the address translation table stored in the node.

24. The node of claim 13, wherein the node is one of a Packet Data Network (PDN) Gateway (P-GW) and a Policy Control and Enforcement Point (PCEP) in an access network of the telecommunications system.

25. A non-transitory computer readable recording medium storing a computer program product for controlling a node in in a telecommunications system for determining a passive Round Trip Time (RTT) delay for exchanging data packets in accordance with a data transmission protocol between a first device and a second device operatively connected to the telecommunications system, wherein the first device is identified by a first device identification, wherein the second device is identified by a second device identification, wherein the data packets comprise an address part including a source address and a destination address, the computer program product comprising software instructions which, when run on processing circuitry of the node, causes the node to:
receive a data packet including an encrypted payload and originating from the first device and directed to the second device, the address part of the data packet comprising the first device identification as source address and the second device identification as destination address;
modify the first device identification of the source address of the received data packet;
modify the received data packet having an address part comprising the modified first device identification as source address and the second device identification as destination address to provide a modified data packet including the encrypted payload;
link, in an address translation table, the address part of the received data packet with the address part of the modified data packet;
transmit, at a first point in time, the modified data packet to the second device;
receive, at a second point in time and from the second device, a response data packet, the response data packet having an address part comprising the modified first device identification as destination address and the second device identification as source address;
modify the received response data packet having an address part comprising the first device identification as destination address and the second device identification as source address, using the address translation table, to provide a modified response data packet;

transmit the modified response data packet to the first device; and determine the RTT delay from the first and second points in time.

* * * * *

UNITED STATES PATENT AND TRADEMARK OFFICE
CERTIFICATE OF CORRECTION

| | | |
|---|---|---|
| PATENT NO. | : 11,943,147 B2 | Page 1 of 1 |
| APPLICATION NO. | : 17/207954 | |
| DATED | : March 26, 2024 | |
| INVENTOR(S) | : Gochi Garcia et al. | |

It is certified that error appears in the above-identified patent and that said Letters Patent is hereby corrected as shown below:

In the Specification

In Column 1, Line 9, delete "2018," and insert -- 2018, now U.S. Pat. No. 10,972,399, --, therefor.

In Column 2, Line 38, delete "to it." and insert -- it. --, therefor.

In Column 3, Line 29, delete "un-affected." and insert -- unaffected. --, therefor.

In Column 5, Line 33, delete "uniquely." and insert -- unique. --, therefor.

In Column 5, Line 53, delete "not being" and insert -- not --, therefor.

In Column 9, Line 49, delete "Enforcement Point, PCEP, arranged in an access network" and insert the same on Line 48 after "and" as a continuation paragraph.

In Column 10, Line 12, delete "Packet Gateway," and insert -- Packet Data Network Gateway, --, therefor.

In Column 10, Line 20, delete "FIGS. 3-6," and insert -- FIGS. 3-6. --, therefor.

In Column 10, Line 67, delete "(no changed" and insert -- (no --, therefor.

In Column 13, Line 12, delete "first device 6 is a UE 51, second device 4" and insert -- first device 4 is a UE 51, second device 6 --, therefor.

In Column 13, Line 64, delete "server server" and insert -- server --, therefor.

In the Claims

In Column 18, Line 28, in Claim 25, delete "in in" and insert -- in --, therefor.

Signed and Sealed this
Thirtieth Day of July, 2024

*Katherine Kelly Vidal*
Katherine Kelly Vidal
*Director of the United States Patent and Trademark Office*